Dec. 8, 1942.　　　　R. W. DE LANCEY　　　　2,304,444
LIQUID LEVEL CONTROL APPARATUS
Filed Feb. 21, 1941　　　3 Sheets-Sheet 1

INVENTOR
RALPH W. DE LANCEY
BY
ATTORNEY

Dec. 8, 1942.  R. W. DE LANCEY  2,304,444
LIQUID LEVEL CONTROL APPARATUS
Filed Feb. 21, 1941  3 Sheets-Sheet 2

INVENTOR
RALPH W. DELANCEY
BY
[signature]
ATTORNEY

Dec. 8, 1942.   R. W. DE LANCEY   2,304,444
LIQUID LEVEL CONTROL APPARATUS
Filed Feb. 21, 1941   3 Sheets-Sheet 3
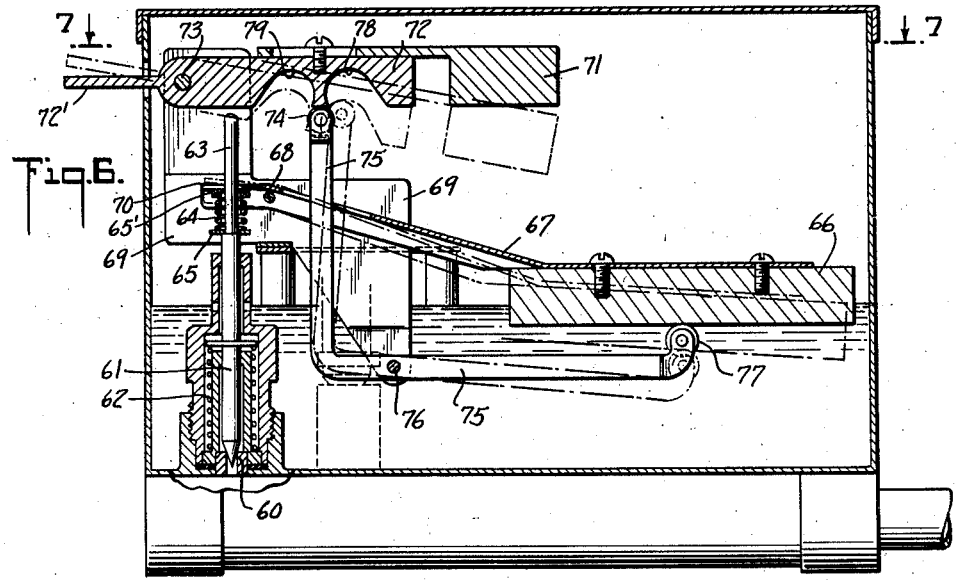
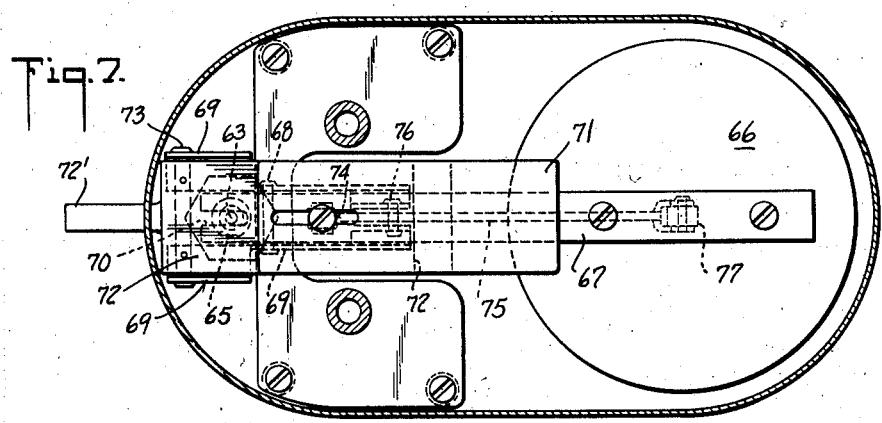
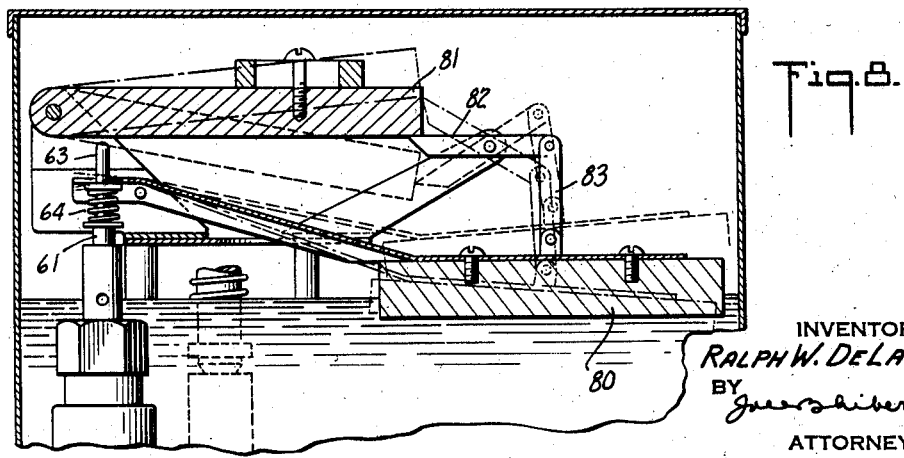
INVENTOR
RALPH W. DE LANCEY
BY
ATTORNEY Patented Dec. 8, 1942

2,304,444

UNITED STATES PATENT OFFICE 2,304,444

LIQUID LEVEL CONTROL APPARATUS

Ralph W. De Lancey, Meriden, Conn., assignor to The Miller Company, Meriden, Conn., a corporation of Connecticut Application February 21, 1941, Serial No. 379,929

16 Claims. (Cl. 137—104)

The present invention relates to liquid level control apparatus, and is more particularly directed to such an apparatus suitable for holding the fuel supply of a gravity fed oil burner at a constant level. These devices are commercially known as constant level valves.

The typical constant level valves heretofore in use have employed hollow floats to actuate the service inlet valve mechanism. Such floats are subject to leakage and when they become water logged they lose their buoyancy and sink so that the service valve may remain open to allow fuel to continue to flow. For this reason safety has always required some form of special equipment to shut off flow of oil into the reservoir if the float leaks, such as an emergency valve which closes when the float sinks (as in my Patent No. 2,219,473), or a trip bucket and bucket controlled valve, or an overflow chamber with auxiliary float, equally likely to leak, for operating the emergency valve.

The present invention contemplates liquid level control apparatus for these purposes characterized by the absence of any hollow float or other device subject to loss of buoyancy through leakage or absorption of liquid. Accordingly the apparatus is provided with a self-opening service and emergency valve mechanism, and valve closing mechanism including a solid, non-porous liquid displacement member adapted to be partially submerged in the liquid when at the normal operating levels, this member being counter-balanced by a weight in air and losing a part of its buoyancy when the liquid rises above the normal operating level, so that the counterweight may, through suitable interconnected linkages, exert pressure on the service valve to close it. With such a mechanism, should the service valve leak, the valve closing pressure would continue to increase until the liquid displacement element becomes fully submerged, but in practice the emergency closing would be complete before this could occur.

The present invention may be adapted to constant level valves of the type in which the inlet valve to the reservoir is allowed to remain open in the event liquid is drained from the reservoir, or to constant level valves of the type where the inlet valve is to be closed should the liquid in the reservoir be drained away. Where the latter condition is to be fulfilled, it is contemplated that the normal interconnection between the weights to provide opposed movements in the valve operating mechanism will include a trip which acts to release the counterweight on lowering of the liquid displacement element below the range of normal operating levels, so that the counterweight may be released and drop and force the valve closed.

It is also contemplated that the trip may be used to effect a more positive high level cut off of fuel flow.

The accompanying drawings show, for purposes of illustrating the present invention, several embodiments in which the invention may take form, it being understood that the drawings are illustrative of the invention rather than limiting the same.

In these drawings:

Figure 6 is a vertical section and Figure 7 a top plan view of one form of construction having trip mechanism;

Figure 8 illustrates the device having a modified trip mechanism;

Figure 1:
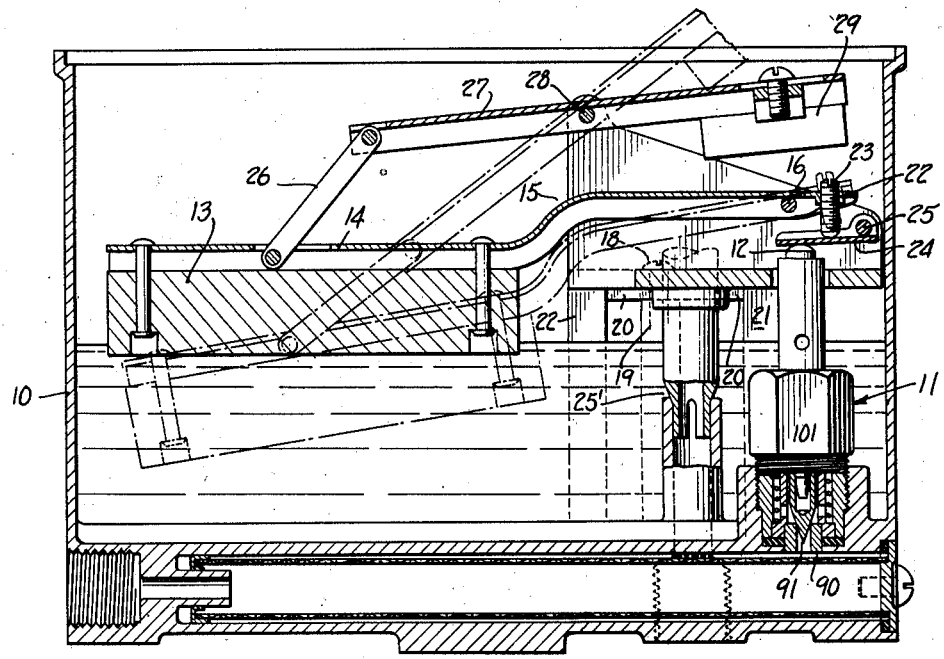
Figure 1 is a sectional view through one form of constant level valve.
Figure 9:
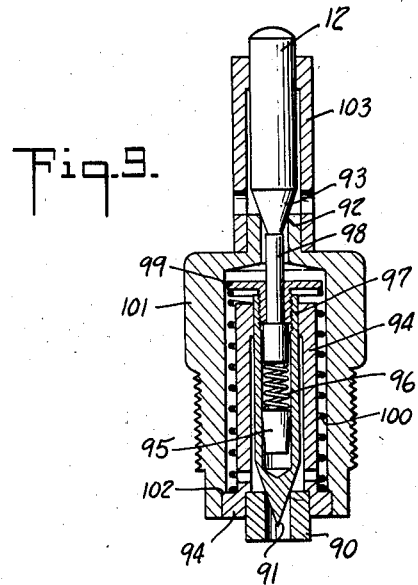
Figure 9 is an enlarged sectional view through an improved form of service and emergency valves for use in the constant level valve of Figure 1.
Figure 2:
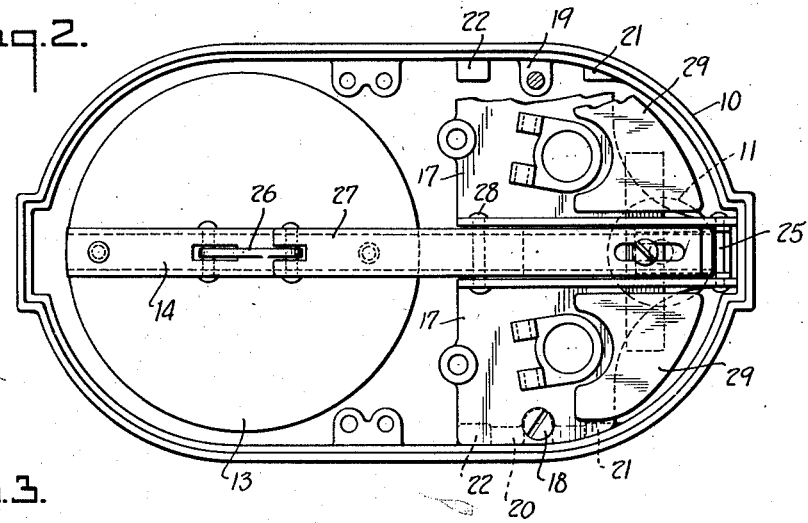
Figure 2 is a top plan view of the constant level valve of Figure 1.

The constant level valve of Figures 1 and 2 has a reservoir 10 and an inlet valve mechanism with both service and emergency valves, the same being generally indicated at 11 and shown in detail in Figure 9. The inlet valve mechanism is biased to open position and has a valve member or plunger 12 adapted to be pressed down to close the inlet valves.

A liquid displacement element 13 made of a light weight alloy, such as aluminum and magnesium, or a plastic block, is secured to the long arm 14 of a lever 15 pivoted at 16 on a bridge 17 fixedly secured within the reservoir by screws 18 passed into lugs 19 formed in the reservoir walls, and aligned by lugs 20 entering between lugs 21 and 22 formed in the reservoir walls. The element 13 is so located that at the desired liquid level to be maintained it has a partial submersion volume V somewhat less than the total volume so that it is buoyed upwardly and has less apparent weight. The short arm 22 of the lever 15 carries an adjustable screw 23 adapted to engage a short lever 24 pivoted at 25 and resting on the plunger 12. The weight 13 is connected by a sloping link 26 with a lever 27 pivoted at 28 to the bridge and carrying an adjustable counterweight 29. The parts carried by the bridge may be assembled as a unit and secured in place.

The dimensions and mass distribution of the system are such that at a predetermined level of liquid the entire system is in balance and while the screw 23 is in contact with the lever 24 no pressure is exerted to close the valve. Any increase in liquid level will submerge more of weight 13 and increase its buoyancy so that it contributes less turning moment to the system, whereupon the counterweight predominates and pressure is applied by screw 23 on lever 24 to depress the plunger 12 of the valve. Obviously a very small predetermined rise in liquid level will cause the system to develop enough pressure on the plunger to close the service valve, and a further rise will bring about a closing of the emergency valve.

The adjustability of the screw 23 and of the position of the weight 29 makes it possible to accurately fix the level at which the valve mechanism is closed and compensate for errors in machining the parts and for slight differences in the weights of the parts.

The arrangement shown in Figures 1 and 2 is one in which adequate pressures may be developed on the valve stem with comparatively light weight parts so that strains on hinge pins and wear of parts is minimized.

When the linkages are as shown in Figures 1 and 2 the extent to which the weight 13 may lower is limited as indicated in dotted lines.

The liquid is drained through a metering valve of any desired form, such as indicated at 25'.

Figure 3:
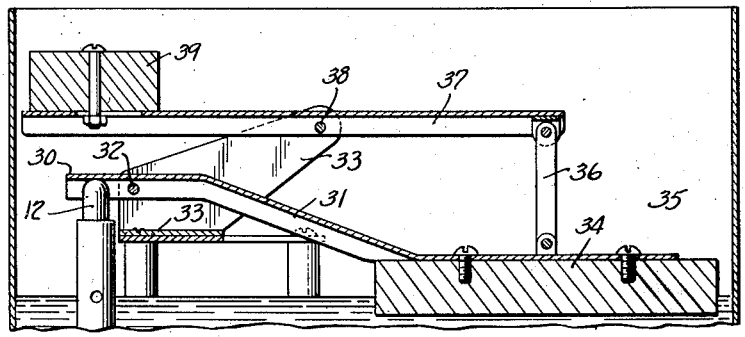
Figures 3 and 4 are fragmentary views of constant level valves similar to Figure 1.

In the arrangement of Figure 3 the plunger 12 of the inlet valve mechanism is below the short arm 30 of a lever 31 pivoted at 32 on a bridge 33 and carrying a liquid displacement element or weight 34, similar to weight 13 and adapted to be partially submerged in oil in a reservoir 35. The weight 34 is connected by a link 36 with a lever arm 37 pivoted at 38 and carrying an adjustable counterweight 39. This structure functions substantially the same as that of Figures 1 and 2, but does not have the ease of adjustment, or the linkage which limits the lowering of the liquid displacement element 34.

Figure 4:
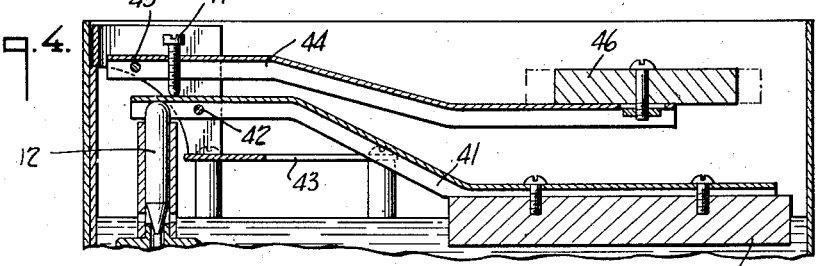

In the arrangement of Figure 4 the liquid displacement element 40 is carried on a lever 41 pivoted at 42 on the bridge 43 and bearing on the plunger 12 of the inlet valve. The bridge 43 also carries a lever 44 pivoted at 45 and carrying an adjustable weight 46. A screw 47 carried by lever 44 and bearing on lever 41 couples the lever systems together and when the oil level increases beyond the desired level the weight 46 operates the system to close the valve. With this construction greater pressures may be applied to the valve stem or plunger 12, but strain on the pivots is much higher than in the previously described constructions.

Figure 5:
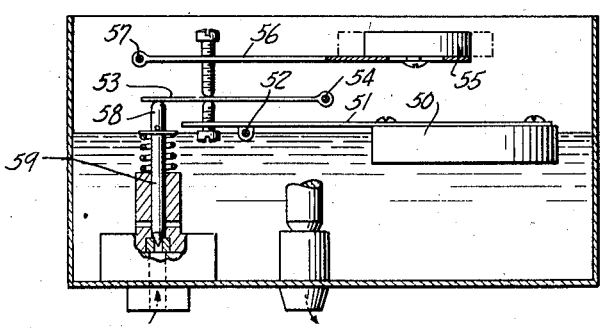
Figure 5 is a diagrammatic showing of another form of construction.

In the arrangement diagrammatically shown in Figure 5, the liquid displacement element or weight 50 is carried on a lever 51 pivoted at 52 and tends to lift a lever 53 pivoted at 54. The lever 53 is pushed down by a counterweight 55 adjustable along an arm 56 pivoted at 57. The end of the lever 53 is opposite the plunger 58 of a simple form of inlet valve 59 spring biased toward open position.

In Figures 6 and 7 the inlet valve has a seat 60 and a valve stem 61 urged upwardly by a spring 62. The upper end of the valve stem is reduced as indicated at 63 and carries a spring 64 interposed between washers 65 and 65' and somewhat stiffer than spring 62.

A liquid displacement element 66 is carried on lever 67 pivoted at 68 on a bridge 69 and the end of the lever is bifurcated at 70 so that the reduced end 63 of the plunger or valve stem 61 for the inlet valve may pass through. A counterweight 71 is adjustably carried on an arm 72 pivoted to the bridge at 73 near the top of the plunger 61 and having an accessible finger piece 72'. In normal position the arm 72 rests on a roller 74 carried on the upper end of a bell crank lever 75 pivoted at 76 to the bridge 69. The other end of lever 75 has a roller 77 in contact with the weight 66. When the liquid rises through the normal range of level the spring 62 yields and valve stem or plunger 61 is pushed down to close the valve. Should the oil supply be cut off and fuel drain out of the reservoir the weight 66 will lower causing the roller 74 to enter a notch 78 in the lever 72. This will permit the counterweight 71 to drop freely and will bring the arm 72 against the top of the plunger 61 and close the valve. Should the inlet valve fail to close when the oil reaches the desired level, the displacement element 66 will continue to rise against the pressure of spring 64. This movement will cause the roller 74 on top of the bell crank 75 to shift to the left and enter the notch 79 in the lever 72 so that the counterweight is freed to cause the lever 72 to drop onto the top of the valve stem to securely close the valve.

The arrangement of Figure 8 is similar to that of Figures 6 and 7. Here the interconnection between the liquid displacement element 80 and the counterweight 81 includes a fixedly pivoted lever 82 and a link 83. For normal operation the parts act in unison. When the oil level becomes excessively high, or too low, the end of the lever 82 moves away from the counterweight to release it.

Figure 10:
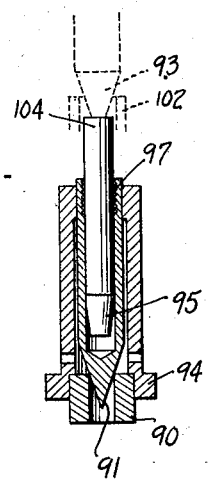
Figure 10 illustrates a portion of the parts used in Figure 9 at one stage of the assembly of Figure 9.

The inlet valve of Figures 1–4 is indicated in Figures 9 and 10. This valve is also suitable for use where the control mechanism includes hollow floats. This valve consists essentially of a primary or service valve with seat at 90, and valve needle at 91 and a secondary or emergency valve with seat 92 and valve needle at 93 with provisions for overtravel between the two valve needles. Here the primary valve seat 90 has a force fit with a primary valve housing 94, and the primary valve stem 91 is received in the housing 94 and counterbored for a friction fitted plug 95, spring 96, and threaded as indicated at 97.

The primary valve stem 91 receives a spacer 98 shouldered at the lower end and adapted to be held against the spring 96 by a bushing 99 carried in the threads 97. The bushing 99 is urged upwardly and the primary valve kept open by a coiled spring 100. The assemblage of the primary valve just described is received in an outer housing 101 shouldered as indicated at 102 to fit the lower end of the primary valve housing 94. The upper end of the housing 101 is provided with the valve seat 92 to cooperate with the needle 93 which is carried at the lower end of the plunger 12. This plunger is guided in a tube 103 secured to the top of the housing 101.

As it is highly important to have the primary or lower valve close first and then have the upper or secondary valve close later in the event the primary valve fails to completely shut off the flow of fuel, it is necessary to maintain accurate overall dimensions.

In manufacturing the valves of Figure 9 the primary valve seat, primary valve housing, primary valve stem 91 and the plug 95 and a standard spacer member 104, shown in Figure 10, are assembled and then inserted into the interior of the housing 101. The valve stem 12 to be used with this assemblage is then pushed against the upper end of the spacer 104. The seating of the upper valve member will cause the spacer 104 to push the plug 95 down in the bore of the primary valve. These parts are accurately made so that the plug 95 has a friction fit. When the two valves are seated it will be seen that all the machining errors which have accumulated in the particular parts assembled in the structure will be such that one can be calibrating the overall length of the assemblage of Figure 10 determine just what the overall length of the corresponding parts of the valve should be to have the two valve members seat simultaneously. After the overall length of the assemblage of Figure 10 has been accurately calibrated the spacer 104 is removed, the spring 96 and spacer 98 inserted and the bushing 99 threaded down against the shoulder on the spacer 98 until the calipers show that the overall length of the primary valve assemblage with projecting stem 98 is about .004 of an inch greater than that of the assemblage of Figure 10. This means that when the plunger 12 has moved down far enough to seat the lower valve there will be a movement of about .004 of an inch necessary before the secondary valve can be seated. This movement is made possible by the spring 96. As these parts are always used in the particular assemblage for which they were calibrated and no movement can be given the plunger 12 after the upper valve has been seated it is obvious that no pressure can be brought against the plug 95 in excess of that which was applied during the assembly of the valve. Therefore the overall length of the parts is fixed and permanent. This is assured by using some form of liquid cement such as litharge and glycerin on the threads 97.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. A liquid level control apparatus comprising a reservoir, means to control the flow of liquid into the reservoir comprising an inlet valve having a valve member spring biased to a predetermined maximum open position, and liquid level responsive means for actuating the valve member toward closed position and permitting the spring to return it to the fully open position, comprising two weights each carried on a lever pivoted on an axis laterally displaced from the axis of the other lever, the levers being interconnected through a lost motion connection with a common pressure applying element having overtravel with respect to the valve member for actuating the valve member toward closed position only without effecting movement of the valve member toward open position except by reason of the action of the spring, and wherein one weight is in air and contributes a substantially constant moment in valve closing direction on said element, and the other weight is in the reservoir and contributes predominating moments in the opposite direction, when the liquid is too low to reach it, and is subject to variable submergence in liquid in the reservoir so that it contributes less moment to said element as the liquid rises whereby at a predetermined height of the liquid in the reservoir the first weight predominates over the other weight and the spring and closes the valve, and so that it contributes an increasing moment as the liquid lowers from said predetermined height whereby the spring may open the valve, and whereupon the pressure applying element is disconnected from the valve member.

2. A liquid level control apparatus comprising a reservoir, means to control the flow of liquid into the reservoir comprising a liquid displacement element of greater weight than that of the liquid displaceable thereby so that it tends to sink, lever means for supporting the liquid displacement element in a position to be partially submerged in the liquid when the liquid is in the region of the desired level, whereby the moment produced thereby is reduced with rise in liquid level, a counterbalancing weight above liquid level and having a mechanical advantage sufficient to balance the partially submerged liquid displacement element at a predetermined level and to predominate on further rise of liquid level, an inlet valve having a valve member spring biased to a predetermined maximum open position, and a valve member operator having a lost motion driving connection with the lever means for actuating the valve member, said actuating means being effective to compress the spring only when the counterbalancing weight has the mechanical advantage over the partially submerged element, and being effective to oppose expansion of the spring only when the liquid level lowers through a range of level in which the mechanical advantage of the counterbalancing weight is present so that when the liquid displacement element predominates the valve member position is independent of the position of the liquid displacement element and the counterweight.

3. For use in a liquid supply system, a device providing a chamber to hold liquid in the system and having an inlet and an outlet for the liquid, and mechanism to maintain a desired liquid level in the chamber, said mechanism including a movable member heavier than the liquid displaceable thereby and mounted to be partially submerged when the liquid is at the desired level so that its apparent weight is reduced, a weight in air, said weight and movable member being so constructed and arranged that the reduction of the apparent weight of the movable member due to its greater buoyancy at an increased depth of submersion creates a force which is less than the force exerted by the weight, an inlet valve having a valve member spring biased to a predetermined maximum open position, and an operator for the valve member responsive to the force exerted by the weight in air when the same is predominating, the operator having overtravel with respect to the open position of the valve member so as to be disconnected therefrom and leave it solely under the control of the spring.

4. A liquid level control apparatus, comprising a reservoir, means to control the flow of liquid into said reservoir comprising an inlet valve having a vertically movable valve member biased upwardly by a spring toward open position, a liquid displacement element of greater weight than the liquid displaceable thereby so that it tends to sink, a lever pivoted on a horizontal axis adjacent the upper end of the valve member and having a long arm to which the liquid displacement element is secured and a short arm operably connected with the valve member to press the valve member down when the liquid displacement element rises above a predetermined level in the region where the liquid displacement element is partially submerged, and a second lever carrying an unbalanced weight in air, the second lever being pivoted on a horizontal axis laterally displaced from the first axis and connected with the first lever to oppose sinking of the liquid displacement element, said unbalanced weight having a contrary statical moment effective only when the liquid level rises above said predetermined level.

5. An apparatus such as claimed in claim 4, wherein the second lever is pivoted above the first lever and between the pivot for the first lever and the liquid displacement element, carries the unbalanced weight above the pivot for the first lever, and is connected at its opposite end with the first lever near the center of the liquid displacement element to lift the latter when the weight lowers.

6. An apparatus such as claimed in claim 4, wherein the second lever is pivoted above the first lever and between the pivot for the first lever and the liquid displacement element, carries an unbalanced weight above the pivot for the first lever, and is connected at its opposite end with the first lever near the center of the liquid displacement element to lift the latter when the weight lowers, and wherein the combined length of the connections between the first lever and the pivot for the second lever is such as to limit the lowering of the liquid displacement element.

7. An apparatus such as claimed in claim 4, wherein the operable connection between the short arm of the first lever and the valve member includes a vertically adjustable screw carried by the first lever and a short lever resting on the upper end of the valve member and engageable by the screw.

8. An apparatus such as claimed in claim 4, having a bridge secured within the reservoir adjacent the valve member and to which the levers are pivoted so that the bridge, levers and parts carried by the levers form a preassembled unit.

9. An apparatus such as claimed in claim 4, wherein the short end of the first lever bears directly upon the upper end of the valve member.

10. A liquid level control apparatus, comprising a reservoir, means to control the flow of liquid into said reservoir comprising an inlet valve having a vertically movable valve member biased upwardly by a spring toward open position, a bridge secured within the reservoir adjacent the valve member, a liquid displacement element of greater weight than the liquid displaceable thereby so that it tends to sink, a lever pivoted to the bridge on a horizontal axis adjacent the upper end of the valve member and having a long arm to which the liquid displacement element is secured and a short arm operably connected with the valve member to press the valve member down when the liquid displacement element rises above a predetermined level in the region where the liquid displacement element is partially submerged, and a second lever pivoted to the bridge on a horizontal axis above the first lever and between the pivot for the first lever and the liquid displacement element, and carrying a weight above the pivot for the first lever, the other end of the second lever being connected with the first lever to oppose sinking of the liquid displacement element, the second lever and weight having a contrary statical moment effective only when the liquid level rises above said predetermined level.

11. An apparatus such as claimed in claim 10, wherein the combined length of the connections between the first lever and the pivot for the second lever is such as to limit the lowering of the liquid displacement element.

12. A liquid level control apparatus, comprising a reservoir, means to control the flow of liquid into said reservoir comprising an inlet valve having a vertically movable valve member biased upwardly by a spring toward open position, a liquid displacement element of greater weight than the liquid displaceable thereby so that it tends to sink, a lever pivoted on a horizontal axis adjacent the upper end of the valve member and having a long arm to which the liquid displacement element is secured and a short arm operably connected with the valve member to press the valve member down when the liquid displacement element rises above a predetermined level in the region where the liquid displacement element is partially submerged, the valve member extending above the end of the first lever, a weighted lever pivoted on a horizontal axis and normally spaced above the end of the valve member, a third lever interconnecting the first and second levers so that the weighted lever opposes sinking of the liquid displacement element, and has a contrary statical moment effective only when the liquid level rises above said predetermined level.

13. An apparatus such as claimed in claim 12, wherein the connection between the third lever and the first and second levers is automatically broken when the liquid displacement element lowers below a predetermined level.

14. An apparatus such as claimed in claim 12, wherein the connection between the third lever and the first and second levers is automatically broken when the liquid displacement element rises above a predetermined level.

15. An apparatus such as claimed in claim 12, wherein the connection between the third lever and the first and second levers is automatically broken when the liquid displacement element lowers below a predetermined level, or when it rises above a predetermined level.

16. A liquid level control apparatus comprising a reservoir whose side walls extend a substantial distance above the normal liquid level to provide an air chamber and having close to one end wall thereof an inlet valve provided with a vertically movable valve member, a lever pivoted on a horizontal axis adjacent the upper end of the valve member and extending toward the other end wall of the reservoir to determine the minimum length of the reservoir, a liquid displacement element secured to the long end of the lever and of greater weight than the liquid it displaces so that it tends to sink, the short end of the lever being operably connected with the valve member to move it toward closed position when the liquid displacement element rises above a predetermined level in the region where the liquid displacement element is partially submerged, and a second lever carrying an unbalanced weight in air, the second lever being pivoted on a horizontal axis laterally displaced from the axis of the first lever, and together with the weight extending lengthwise of the reservoir air space a horizontal distance within said minimum length, the second lever being connected with the first lever to oppose sinking of the liquid displacement element, said unbalanced weight having a contrary statical moment effective only when the liquid level rises above said predetermined level.

RALPH W. DE LANCEY.